United States Patent
Yu et al.

(10) Patent No.: US 12,355,253 B2
(45) Date of Patent: Jul. 8, 2025

(54) PHOTOVOLTAIC SYSTEM, PROTECTION METHOD, AND INVERTER SYSTEM

(71) Applicant: Huawei Digital Power Technologies Co., Ltd., Shenzhen (CN)

(72) Inventors: Xinyu Yu, Shanghai (CN); Kai Xin, Shanghai (CN); Yanzhong Zhang, Shanghai (CN); Yongbing Gao, Shanghai (CN)

(73) Assignee: HUAWEI DIGITAL TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 18/334,653

(22) Filed: Jun. 14, 2023

(65) Prior Publication Data

US 2023/0327453 A1    Oct. 12, 2023

Related U.S. Application Data

(63) Continuation of application No. PCT/CN2020/136339, filed on Dec. 15, 2020.

(51) Int. Cl.
*H02J 3/38* (2006.01)

(52) U.S. Cl.
CPC ............ *H02J 3/38* (2013.01); *H02J 2300/24* (2020.01)

(58) Field of Classification Search
CPC ................................ H02J 3/38; H02J 2300/24
See application file for complete search history.

(56) References Cited

U.S. PATENT DOCUMENTS

| | | | |
|---|---|---|---|
| 2005/0139259 A1 | 6/2005 | Steigerwald et al. | |
| 2013/0181519 A1* | 7/2013 | Lee | H02J 3/38 307/24 |
| 2016/0190811 A1 | 6/2016 | Pan et al. | |
| 2017/0155342 A1* | 6/2017 | Deboy | H02M 7/53871 |

FOREIGN PATENT DOCUMENTS

| | | |
|---|---|---|
| CN | 104218609 A | 12/2014 |
| CN | 104467653 A | 3/2015 |
| CN | 104538987 A | 4/2015 |
| CN | 205430162 U | 8/2016 |
| CN | 206099366 U | 4/2017 |
| CN | 106961118 A | 7/2017 |
| WO | 2012043919 A1 | 4/2012 |

* cited by examiner

*Primary Examiner* — Carlos Amaya
(74) *Attorney, Agent, or Firm* — Conley Rose, P.C.

(57) ABSTRACT

A photovoltaic system includes a controller and two groups of inverters. The two groups of inverters include a positive inverter group and a negative inverter group. The positive inverter group includes at least two inverters: a first inverter and a third inverter. The negative inverter group includes at least two inverters: a second inverter and a fourth inverter. Alternating current output ends of the first inverter and the third inverter are connected in parallel. Direct current input ends of the first inverter and the second inverter are connected in series. Alternating current output ends of the second inverter and the fourth inverter are connected in parallel. Direct current input ends of the third inverter and the fourth inverter are connected in series.

20 Claims, 9 Drawing Sheets

Obtain a circulating current between at least two inverters whose alternating current output ends are connected in parallel — S801

When the circulating current is greater than a preset current threshold, control all inverters whose corresponding alternating current output ends are connected in parallel to undergo wave sealing — S802

PHOTOVOLTAIC SYSTEM, PROTECTION METHOD, AND INVERTER SYSTEM

CROSS-REFERENCE TO RELATED APPLICATION

This is a continuation of International Patent Application No. PCT/CN2020/136339 filed on Dec. 15, 2020, the disclosure of which is hereby incorporated by reference in its entirety.

TECHNICAL FIELD

This application relates to the field of photovoltaic power generation technologies, and in particular, to a photovoltaic system, a protection method, and an inverter system.

BACKGROUND

At present, photovoltaic power generation is increasingly valued, and a voltage level is increasingly high. Typical photovoltaic power generation is: converting a direct current output by a photovoltaic array into an alternating current by an inverter, and then connecting the alternating current to a power grid or supplying the alternating current to a load.

To improve a power capacity of the inverter, a common implementation is to connect alternating current output ends of a plurality of inverters in parallel to obtain higher power. However, when the plurality of inverters is connected in parallel, if a direct current bus capacitor of one inverter is short-circuited, a direct current bus voltage of a non-faulty inverter may increase. In a serious case, a component of the inverter may be damaged due to direct current bus overvoltage, causing fault expansion.

SUMMARY

This application provides a photovoltaic system, a protection method, and an inverter system, to protect, when an inverter is short-circuited, the faulty inverter and an inverter connected in parallel to the faulty inverter in a timely manner, thereby avoiding fault expansion.

An embodiment of this application provides a photovoltaic system, including a controller and two groups of inverters. The two groups of inverters include a positive inverter group and a negative inverter group. The positive inverter group includes the following at least two inverters: a first inverter and a third inverter. The negative inverter group includes the following at least two inverters: a second inverter and a fourth inverter. Alternating current output ends of the first inverter and the third inverter are connected in parallel. Direct current input ends of the first inverter and the second inverter are connected in series. Alternating current output ends of the second inverter and the fourth inverter are connected in parallel. Direct current input ends of the third inverter and the fourth inverter are connected in series. The controller obtains a circulating current between at least two inverters whose alternating current output ends are connected in parallel. The circulating current is greater than a preset current threshold or a rising rate of the circulating current is greater than a preset rate. If a large circulating current appears between inverters whose alternating current sides are connected in parallel, it indicates that an inverter is short-circuited. In this case, to protect the inverters and ensure running safety of the photovoltaic system, it is necessary to control all inverters whose corresponding alternating current output ends are connected in parallel to undergo wave blocking, that is, control all inverters connected in parallel to the faulty inverter to undergo the wave blocking, where the wave blocking means that all power components of the inverters stop a switching action. Generally, all the power components can be controlled to be turned off through the wave blocking. The manner provided in this embodiment of this application is particularly applicable to a scenario in which a direct current side of the faulty inverter and a direct current side of an inverter are connected in series, and the circulating current is more likely to be formed. In this way, the short-circuit fault has a larger impact range, and if control is not performed in a timely manner, the fault may occur in the entire system.

In this embodiment of this application, to resolve the short-circuit fault, the inverters are protected in a timely manner, to minimize further impact caused by the short-circuit fault. To be specific, when the short-circuit fault occurs in at least one of the inverters, the circulating current may flow back, through a path formed by a filter capacitor, to a direct current input end from an alternating current output end of an inverter connected in parallel to the faulty inverter, which further affects an inverter connected in series to the faulty inverter. To ensure safety of each inverter in the photovoltaic system, as long as the circulating current of the inverter connected in parallel to the faulty inverter is greater than the preset current threshold, the wave blocking is performed on the inverter. Therefore, the inverter and another inverter that may be affected are protected, to avoid a greater potential safety hazard caused by the short-circuit fault. The system and the method provided in embodiments of this application can implement comprehensive protection against a short-circuit fault without adding any new hardware.

In a possible implementation, after the wave blocking, the controller is further configured to turn off a grid-connected switch corresponding to a faulty inverter whose direct current bus voltage is less than a preset voltage threshold, and the grid-connected switch is connected in series between an alternating current output end of the corresponding inverter and a power grid. In the foregoing, the faulty inverter is determined when the direct current bus voltage is less than the preset voltage threshold. In addition, when the direct current bus voltage drops quickly, that is, when a drop rate of the direct current bus voltage is greater than a preset drop rate, it may also be determined that the inverter is short-circuited, that is, the inverter is the faulty inverter. To ensure system safety, the faulty inverter needs to be isolated from the system. Therefore, the grid-connected switch corresponding to the faulty inverter needs to be turned off.

In a possible implementation, to further ensure system safety and avoid a larger fault range, after the wave blocking, the controller is further configured to turn off a grid-connected switch corresponding to an inverter connected in series to the faulty inverter. To be specific, when there exists an inverter connected in series to the faulty inverter, the inverter connected in series to the faulty inverter also needs to be isolated. That is, the inverter connected in series to the faulty inverter is removed from the system, and is not involved in the system fault. A grid-connected switch of the inverter connected in series to the faulty inverter is also turned off.

In a possible implementation, after the faulty inverter is isolated, that is, after the grid-connected switch corresponding to the faulty inverter is turned off, the controller controls a power component of a non-faulty inverter to resume a switching action, that is, the wave blocking is released, and the non-faulty inverter starts to perform the switching action based on a drive signal, to convert a direct current into an alternating current.

In a possible implementation, each inverter may correspond to one controller, that is, there may be a plurality of controllers. The inverters one-to-one correspond to the controllers. The controller completes control of a corresponding inverter. The controller may be integrated with the inverter, for example, integrated in a cabinet of the inverter. A quantity of controllers is not limited in this embodiment of this application. Alternatively, all inverters may share one controller, provided that all the inverters can communicate with the controller.

In a possible implementation, when each inverter corresponds to one controller, each controller is further configured to: obtain a common-mode output current based on a three-phase output current of a corresponding inverter; and when the common-mode output current is greater than the preset current threshold or a rising rate of the common-mode output current is greater than the preset rate, control the inverter to undergo the wave blocking and control an inverter connected in parallel to a parallel-connected output end of the inverter to undergo the wave blocking. In this embodiment, the common-mode output current represents the circulating current between the inverters.

Based on the photovoltaic system provided in the foregoing embodiment, this embodiment of this application further provides a photovoltaic system protection method. A bipolar photovoltaic system includes: a controller and two groups of inverters. The two groups of inverters include a positive inverter group and a negative inverter group. The positive inverter group includes the following at least two inverters: a first inverter and a third inverter. The negative inverter group includes the following at least two inverters: a second inverter and a fourth inverter. Alternating current output ends of the first inverter and the third inverter are connected in parallel. Direct current input ends of the first inverter and the second inverter are connected in series. Alternating current output ends of the second inverter and the fourth inverter are connected in parallel. Direct current input ends of the third inverter and the fourth inverter are connected in series.

The method includes obtaining a circulating current between at least two inverters whose alternating current output ends are connected in parallel; and when the circulating current is greater than a preset current threshold or a rising rate of the circulating current is greater than a preset rate, controlling all inverters whose corresponding alternating current output ends are connected in parallel to undergo wave blocking, where the wave blocking means that all power components of the inverters stop a switching action.

In a possible implementation, after the controlling all inverters whose corresponding alternating current output ends are connected in parallel to undergo wave blocking, the method further includes: turning off a grid-connected switch corresponding to a faulty inverter whose direct current bus voltage is less than a preset voltage threshold, where the grid-connected switch is connected in series between an alternating current output end of the corresponding inverter and a power grid.

In a possible implementation, after the controlling all inverters whose corresponding alternating current output ends are connected in parallel to undergo wave blocking, the controller further includes: turning off a grid-connected switch corresponding to an inverter connected in series to the faulty inverter.

In a possible implementation, after the grid-connected switch corresponding to the faulty inverter is turned off, the method further includes controlling a power component of a non-faulty inverter to resume a switching action.

In a possible implementation, the obtaining a circulating current between at least two inverters whose alternating current output ends are connected in parallel specifically includes: obtaining a three-phase output current of each of the inverters whose alternating current output ends are connected in parallel; obtaining a common-mode output current of the corresponding inverter based on the three-phase output current; and using the common-mode output current as the circulating current of the inverter.

The advantages of the foregoing photovoltaic system are also applicable to the method provided in this embodiment. Details are not described herein again.

The foregoing describes the photovoltaic system including the plurality of inverters whose alternating current output ends are connected in parallel. The following describes a universal inverter system, and a specific application scenario is not limited as long as the plurality of inverters whose alternating current output ends are connected in parallel are included.

An inverter system provided in this embodiment of this application includes: a controller and at least two inverters. Input ends of the at least two inverters are respectively connected to corresponding direct current power supplies. Alternating current output ends of the at least two inverters are connected in parallel. The controller is specifically configured to: obtain a circulating current between the at least two inverters whose alternating current output ends are connected in parallel; and when the circulating current is greater than a preset current threshold or a rising rate of the circulating current is greater than a preset rate, control all inverters whose corresponding alternating current output ends are connected in parallel to undergo wave blocking, where the wave blocking means that all power components of the inverters stop a switching action.

In a possible implementation, after the wave blocking, the controller is further configured to turn off a grid-connected switch corresponding to a faulty inverter whose direct current bus voltage is less than a preset voltage threshold, and the grid-connected switch is connected in series between an alternating current output end of the corresponding inverter and a power grid.

In a possible implementation, after the wave blocking, the controller is further configured to turn off a grid-connected switch corresponding to an inverter connected in series to the faulty inverter.

In a possible implementation, after the grid-connected switch corresponding to the faulty inverter is turned off, the controller is further configured to control a power component of a non-faulty inverter to resume a switching action.

In a possible implementation, the controller is further configured to: obtain a common-mode output current based on a three-phase output current of a corresponding inverter; and when the common-mode output current is greater than the preset current threshold or a rising rate of the common-mode output current is greater than the preset rate, control the inverter to undergo the wave blocking and control an inverter connected in parallel to a parallel-connected output end of the inverter to undergo the wave blocking.

The advantages of the foregoing photovoltaic system in the foregoing embodiments are also applicable to the inverter system. Details are not described herein again.

According to the foregoing technical solutions, it can be learned that embodiments of this application have the following advantages.

According to the technical solutions provided in embodiments of this application, protection is performed in a timely manner when it is determined that the direct current bus of the inverter is short-circuited. That the direct current bus is short-circuited includes that the entire direct current bus is short-circuited, that is, both two capacitors that are connected in series at an input end of the inverter are short-circuited. That the direct current bus is short-circuited also includes a half-direct current bus-to-ground fault, that is, one capacitor that is at the input end of the inverter is short-circuited. The inverters whose alternating current output ends are connected in parallel may affect each other. For example, when a direct current bus of one of the inverters is short-circuited, a circulating current may occur between the inverters connected in parallel. If the circulating current is excessively high, the power component of the inverter may be damaged and power consumption may be excessively high. In a serious case, protection shutdown may be triggered. In this embodiment of this application, to resolve the short-circuit fault, the inverters are protected in a timely manner, to minimize further impact caused by the short-circuit fault. To be specific, when the short-circuit fault occurs in the at least one of the inverters, the circulating current may flow back, through the path formed by the filter capacitor, to the direct current input end from the alternating current output end of the inverter connected in parallel to the faulty inverter, which further affects the inverter connected in series to the faulty inverter. To ensure safety of each inverter in the photovoltaic system, as long as the circulating current of the inverter connected in parallel to the faulty inverter is greater than the preset current threshold, the wave blocking is performed on the inverter. Therefore, the inverter and another inverter that may be affected are protected, to avoid a greater potential safety hazard caused by the short-circuit fault. The system and the method provided in embodiments of this application can implement comprehensive protection against a short-circuit fault without adding any new hardware.

DESCRIPTION OF EMBODIMENTS

The following terms "first", "second", and the like are only intended for a purpose of description, and shall not be understood as an indication or implication of relative importance or implicit indication of a quantity of indicated technical characteristics. Therefore, a feature limited by "first" or "second" may explicitly or implicitly include one or more features. In the descriptions of this application, unless otherwise stated, "a plurality of" means two or more than two.

In addition, in this application, orientation terms such as "up" and "down" may include but are not limited to orientations of schematically placed components in relative accompanying drawings. It should be understood that these orientation terms may be relative concepts. The orientation terms are used for relative description and clarification, and may vary correspondingly based on a change in an orientation in which the component is placed in the accompanying drawings.

In this application, unless otherwise specified and limited, the term "connection" should be understood in a broad sense. For example, the "connection" may be a fixed connection, a detachable connection, an integration, a direct connection, or an indirect connection by using an intermediate medium. In addition, the term "coupling" may be a manner of implementing an electrical connection for signal transmission. The "coupling" may be a direct electrical connection, or may be an indirect electrical connection through an intermediate medium.

System Embodiment

To enable persons skilled in the art to better understand technical solutions provided in embodiments of this application, the following describes a photovoltaic system provided in embodiments of this application.

Figure 1:
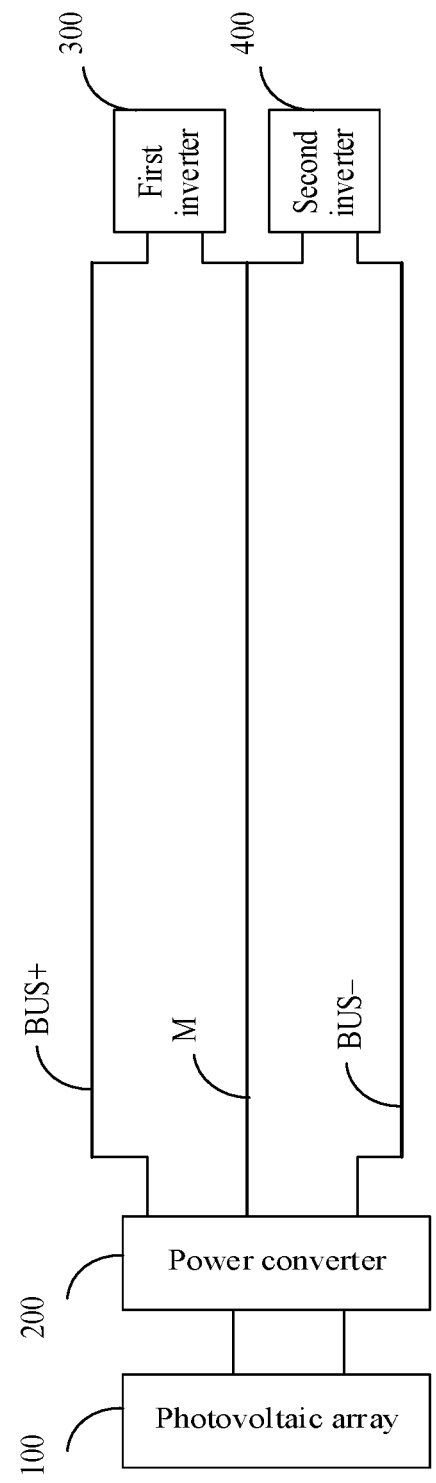
FIG. 1 is a schematic diagram of a photovoltaic system according to an embodiment of this application.

FIG. 1 is a schematic diagram of a photovoltaic system according to an embodiment of this application.

In this embodiment, a bipolar photovoltaic system is merely used as an example for description, and a specific implementation form of the photovoltaic system is not limited.

The bipolar photovoltaic system provided in this embodiment of this application differs from a conventional unipolar photovoltaic system in that the bipolar photovoltaic system includes three buses: a positive direct current bus BUS+, a neutral bus M, and a negative direct current bus BUS−.

For example, if a voltage of BUS+ is +1500 V, and a voltage of BUS− is −1500 V, a voltage level of the bipolar photovoltaic system is ±1500 V. However, a voltage obtained after the BUS+ and the BUS− are connected in series is 3000 V. Therefore, the bipolar photovoltaic system provided in this embodiment of this application may be applied to a 1500 V safety regulation, to reduce a voltage withstand requirement for a power converter and a power tube in the inverter.

Input ends of a power converter 200 are connected to a photovoltaic array 100. A first output end of the power converter 200 is connected to a first end of the positive direct current bus BUS+, a second output end of the power converter 200 is connected to a first end of the neutral bus M, and a third output end of the power converter 200 is connected to a first end of the negative direct current bus BUS−.

In addition, the bipolar photovoltaic system includes at least two inverters: a first inverter 300 and a second inverter 400.

A first input end of the first inverter 300 is connected to a second end of the positive direct current bus BUS+, and a second input end of the first inverter 300 is connected to a second end of the neutral bus M.

A first input end of the second inverter 400 is connected to the second end of the neutral bus M, and a second input end of the second inverter 400 is connected to a second end of the negative direct current bus BUS−.

Alternatively, the neutral bus M may not exist, that is, the neutral bus M is not an open wire, provided that potentials of a neutral point of the power converter 200 and a neutral point on an inverter side each are within a preset voltage range. For example, for the foregoing 3000 V photovoltaic system, a preset voltage range may be 100 V. In this embodiment of this application, only an example in which M is the open wire is used for description.

A load or an energy storage battery may be mounted between BUS+ and M, or between BUS− and M. As shown in FIG. 1, an energy storage battery BAT1 is mounted between BUS+ and M. An energy storage battery BAT2 is mounted between BUS− and M. A load 1 is mounted between BUS+ and M. A load 2 is mounted between BUS− and M.

Figure 2:
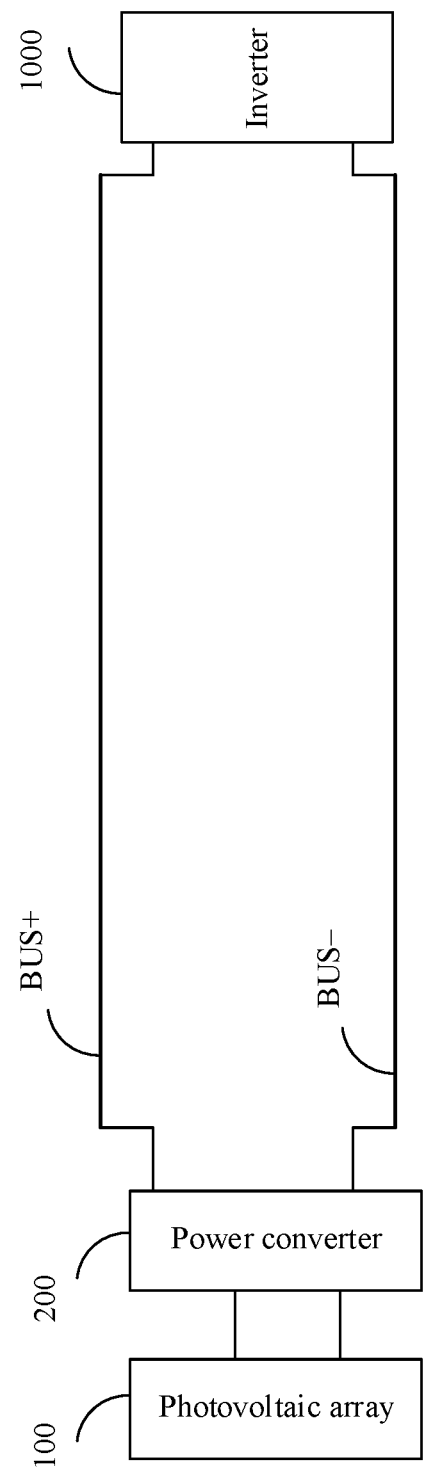
FIG. 2 is a schematic diagram of a unipolar photovoltaic system.

To enable persons skilled in the art to better understand advantages of the bipolar photovoltaic system provided in this embodiment of this application, FIG. 2 is a schematic diagram of a conventional unipolar photovoltaic system.

A power converter 200 includes two output ends. A first output end of the power converter 200 is connected to a positive direct current bus BUS+, and a second output end of the power converter 200 is connected to a negative direct current bus BUS−. Similarly, an inverter 1000 includes two input ends, where a first input end of the inverter 1000 is connected to BUS+, and a second input end of the inverter 1000 is connected to BUS−. The input ends of the power converter 200 are connected to a photovoltaic array 100.

It can be learned, by comparing FIG. 1 with FIG. 2, that the unipolar photovoltaic system shown in FIG. 2 includes two direct current buses: BUS+ and BUS−. If a total voltage of the direct current buses is still 3000 V, the input ends of the inverter 1000 are connected at a voltage level of 3000 V. A withstand voltage of a power tube inside the inverter 1000 is twice that of a power tube inside the single inverter shown in FIG. 1. Therefore, the bipolar photovoltaic system shown in FIG. 1 can reduce a voltage drop borne by a power component, which is conducive to component type selection.

In actual operation, a distance between the power converter and a post-stage inverter may be long. Therefore, a loss on a power cable corresponding to the direct current bus is large. Therefore, to improve power generation efficiency, the loss needs to be reduced as much as possible. The total voltage of the direct current buses corresponding to FIG. 1 is 3000 V. A higher voltage indicates a smaller current. Therefore, a loss on the direct current bus can be reduced.

In actual operation, the bipolar photovoltaic system may include a plurality of groups of bipolar inverters, for example, M groups of bipolar inverters, where M is an integer greater than or equal to 2. Each group includes two inverters: one positive inverter and one negative inverter. The M groups of bipolar inverters include M*2 inverters, for example, four, six, and eight inverters. A specific value of M is not specifically limited in this embodiment of this application, and the value of M may be set based on an actual power requirement. In the following, an example in which M is 2, that is, there are two groups of bipolar inverters, is used for description. In other words, there are four corresponding inverters, including two positive inverters and two negative inverters. The bipolar photovoltaic system includes a positive inverter group and a negative inverter group. Alternating current output ends of all inverters in the positive inverter group are connected in parallel, and alternating current output ends of all inverters in the negative inverter group are connected in parallel.

The inverters whose alternating current output ends are connected in parallel may affect each other. For example, when one of the inverters is short-circuited, a circulating current may occur between the inverters connected in parallel. If the circulating current is excessively high, the power component of the inverter may be damaged and power consumption may be excessively high. In a serious case, protection shutdown may be triggered. In this embodiment of this application, to resolve the short-circuit fault, the inverters are protected in a timely manner, to minimize further impact caused by the short-circuit fault.

In both FIG. 1 and FIG. 2, an example in which the photovoltaic system includes the power converter is used for description. In addition, in another implementation, the photovoltaic system does not include the power converter, that is, the photovoltaic array may be directly connected to the inverter. This also falls within the scope described in embodiments of this application. FIG. 1 and FIG. 2 in embodiments of this application are merely examples for description.

The following uses two groups of bipolar inverters as an example for description.

Figure 3:
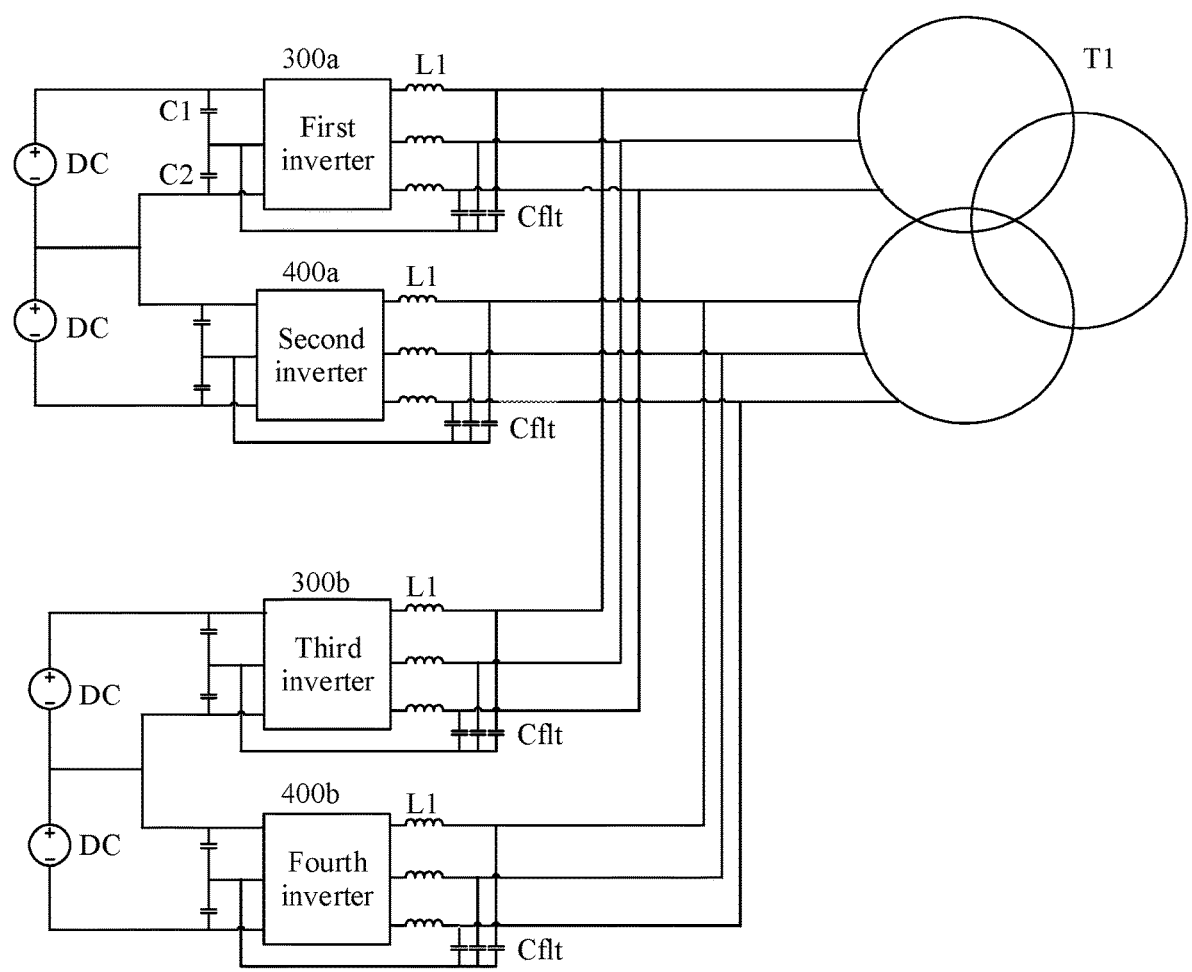
FIG. 3 is a schematic diagram of another photovoltaic system according to an embodiment of this application.

FIG. 3 is a schematic diagram of another photovoltaic system according to an embodiment of this application.

The bipolar photovoltaic system provided in this embodiment of this application includes a controller and two groups of inverters.

The two groups of inverters include a positive inverter group and a negative inverter group.

The positive inverter group includes the following at least two inverters: a first inverter 300a and a third inverter 300b. The negative inverter group includes the following at least two inverters: a second inverter 400a and a fourth inverter 400b. Alternating current output ends of the first inverter 300a and the third inverter 300b are connected in parallel. Direct current input ends of the first inverter 300a and the second inverter 400a are connected in series. As shown in FIG. 3, specifically, a negative direct current input end of the first inverter 300a is connected to a positive direct current input end of the second inverter 400a. Alternating current output ends of the second inverter and the fourth inverter are connected in parallel. Direct current input ends of the third inverter and the fourth inverter are connected in series.

The first inverter 300a, the second inverter 400a, the third inverter 300b, and the fourth inverter 400b are respectively connected to corresponding direct current power supplies DC. The direct current power supplies DC may respectively correspond to photovoltaic arrays. The photovoltaic array may include a plurality of photovoltaic strings that are connected in parallel.

The controller (not shown in the figure) is specifically configured to: obtain a circulating current between at least two inverters whose alternating current output ends are connected in parallel; and when the circulating current is greater than a preset current threshold or a rising rate of the circulating current is greater than a preset rate, control all inverters whose corresponding alternating current output ends are connected in parallel to undergo wave blocking, where the wave blocking means that all power components of the inverters stop a switching action. In a possible implementation, all the power components are turned off. The preset rate herein is a preset rising rate.

It should be understood that, during specific implementation, there are two conditions for determining to perform the wave blocking on the inverter. One condition is that the circulating current is large, that is, the circulating current is greater than the present current threshold. The other condition is that the circulating current rises quickly, that is, the rising rate of the circulating current is greater than the preset rate. Either of the foregoing two conditions can be used as a basis.

The technical solutions provided in this embodiment of this application are applicable to a scenario in which a direct current bus capacitor connected to an input end of an inverter is short-circuited. The first inverter 300a is used as an example for description. As shown in FIG. 3, an input end of the first inverter 300a is connected to two capacitors that are connected in series: a first capacitor C1 and a second capacitor C2. A first end of the first capacitor C1 is connected to a positive direct current input end of the first inverter 300a, and a second end of the first capacitor C1 is connected to a first end of the second capacitor C2. A second end of the second capacitor C2 is connected to the negative direct current input end of the first inverter 300a. That the direct current bus capacitor is short-circuited may include that both C1 and C2 are short-circuited, and may also include that one of the capacitors is short-circuited, that is, C1 is short-circuited or C2 is short-circuited. A direct current bus voltage of the first inverter 300a is a voltage on C1 and C2. Therefore, when C1 and/or C2 are/is short-circuited, the direct current bus of the first inverter 300a is short-circuited. This also applies to another inverter. Details are not described herein.

In another representation form in which the circulating current is greater than the preset current threshold, the rising rate of the circulating current may also be detected. When the rising rate of the circulating current is greater than the preset rate, it is considered that the inverter is short-circuited.

In this embodiment, the photovoltaic system may include a plurality of sub-arrays. For each inverter of the sub-array, a local common-mode output current of the inverter is collected as the circulating current. When the circulating current is greater than the preset current threshold, the wave blocking is performed.

For inverters whose output ends are connected in parallel, all circulating currents of the inverters need to be monitored. As long as a circulating current of one inverter is greater than the preset current threshold, all inverters connected in parallel to the inverter need to be controlled to be wave-blocked. As shown in FIG. 3, when a circulating current between the first inverter 300a and the third inverter 300b that are connected in parallel is greater than the preset current threshold, both the first inverter 300a and the third inverter 300b needs to be wave-blocked, regardless of whether the circulating current flows from the first inverter 300a to the third inverter 300b or from the third inverter 300b to the first inverter 300a.

The controller herein is a general term. In actual application, there may be a plurality of controllers, that is, the inverters one-to-one correspond to the controllers. An implementation form of the controller is not specifically limited in this embodiment of this application. For example, the controller may be a single-chip microcomputer, a microprocessor, a digital signal processor, or a logic control circuit. In addition, the plurality of inverters may share one controller, and this is not limited in this embodiment of this application.

When one inverter corresponds to one controller, each controller is further configured to: obtain a common-mode output current based on a three-phase output current of a corresponding inverter; and when the common-mode output current is greater than the preset current threshold, control the inverter to undergo the wave blocking and control an inverter connected in parallel to a parallel-connected output end of the inverter to undergo the wave blocking.

In actual application, a common-mode output current of each inverter may represent a circulating current between the inverter and an inverter connected in parallel to the inverter. The following describes a specific implementation for obtaining the common-mode output current based on the three-phase output current.

It should be noted that the three-phase output current of the inverter may be obtained by using a current detection circuit, for example, a current sensor. After obtaining the three-phase output current, the current sensor sends the three-phase output current to a controller corresponding to the inverter. A current detection circuit corresponding to each inverter detects three phases of output currents $i_a$, $i_b$, and $i_c$ of the inverter in real time. The controller calculates a common-mode output current $i_{cir}$ according to the following formula:

$$i_{cir} = \frac{i_a + i_b + i_c}{3}$$

The controller compares the common-mode output current with the preset current threshold. When the common-mode output current is greater than the preset current threshold, it indicates that a large circuiting current appears between the inverter and the inverter connected in parallel to the inverter, and a protection measure need to be taken. Therefore, the controller needs to perform the wave blocking on the inverter. Similarly, a controller of the inverter connected in parallel to the inverter also determines that a large circulating current appears, and also performs the wave blocking on a corresponding inverter.

The following describes a possible fault-caused circulating current path with reference to the accompanying drawings. In FIG. 3, L1 is a filter inductor connected in series between an alternating current output end of each inverter and a transformer T1. Specifically, a first end of L1 is connected to the alternating current output end of the inverter, and a second end of L1 is connected to a primary-side winding of T1. Cflt is a filter capacitor connected to the alternating current output end of each inverter. Specifically, a first end of Cflt is connected to a second end of L1, and a second end of Cflt is connected to a direct current input end of the inverter. In one manner, two bus capacitors connected in series are connected between a positive direct current input end and a negative direct current input end of the inverter, and the second end of Cflt is connected to a common point of the two bus capacitors.

For example, when a direct current bus of the first inverter 300a is short-circuited, a current at the alternating current output end of the third inverter 300b flows to the direct current input end of the first inverter 300a. A current at the direct current input end of the first inverter 300a flows to the direct current input end of the second inverter 400a. A current at the alternating current output end of the second inverter 400a flows to the alternating current output end of the fourth inverter 400b, from the alternating current output end of the fourth inverter 400b to the direct current input end of the fourth inverter 400b, and from the direct current input end of the fourth inverter 400b to the direct current input end of the third inverter 300b.

Therefore, it can be learned from the foregoing analysis that although the direct current bus of the first inverter 300a in the bipolar photovoltaic system is short-circuited, the circulating current caused by the short-circuit fault flows through the four inverters, that is, flows through all the inverters. As a result, a controller of each inverter detects that a common-mode output current of the corresponding inverter is greater than the preset current threshold, to perform the wave blocking on all the inverters, that is, to turn off all power components in the inverters. For example, low-level drive pulse signals may be sent to all the power components, and no switching action is performed on all the power components.

It should be noted that a power converter may be further included between the inverter and the corresponding photovoltaic array. For example, the power converter may include a boost circuit and the like. An implementation type of the power converter is not specifically limited in this embodiment of this application.

In the bipolar photovoltaic system provided in this embodiment of this application, when one of the inverters is short-circuited, the circulating current appears between the faulty inverter and an inverter connected in parallel to the faulty inverter. In addition, a direct current input end of each inverter is connected in series to an inverter. Therefore, the circulating current flows back, through a path formed by the filter capacitor Cflt, to the direct current input end from an alternating current output end of the inverter connected in parallel to the faulty inverter. This further affects an inverter connected in series to the faulty inverter. To ensure safety of each inverter in the photovoltaic system, as long as the circulating current of the inverter connected in parallel to the faulty inverter is greater than the preset current threshold, the wave blocking is performed on the inverter. Therefore, the inverter and another inverter that may be affected are protected, to avoid a greater potential safety hazard caused by the short-circuit fault.

Figure 4:
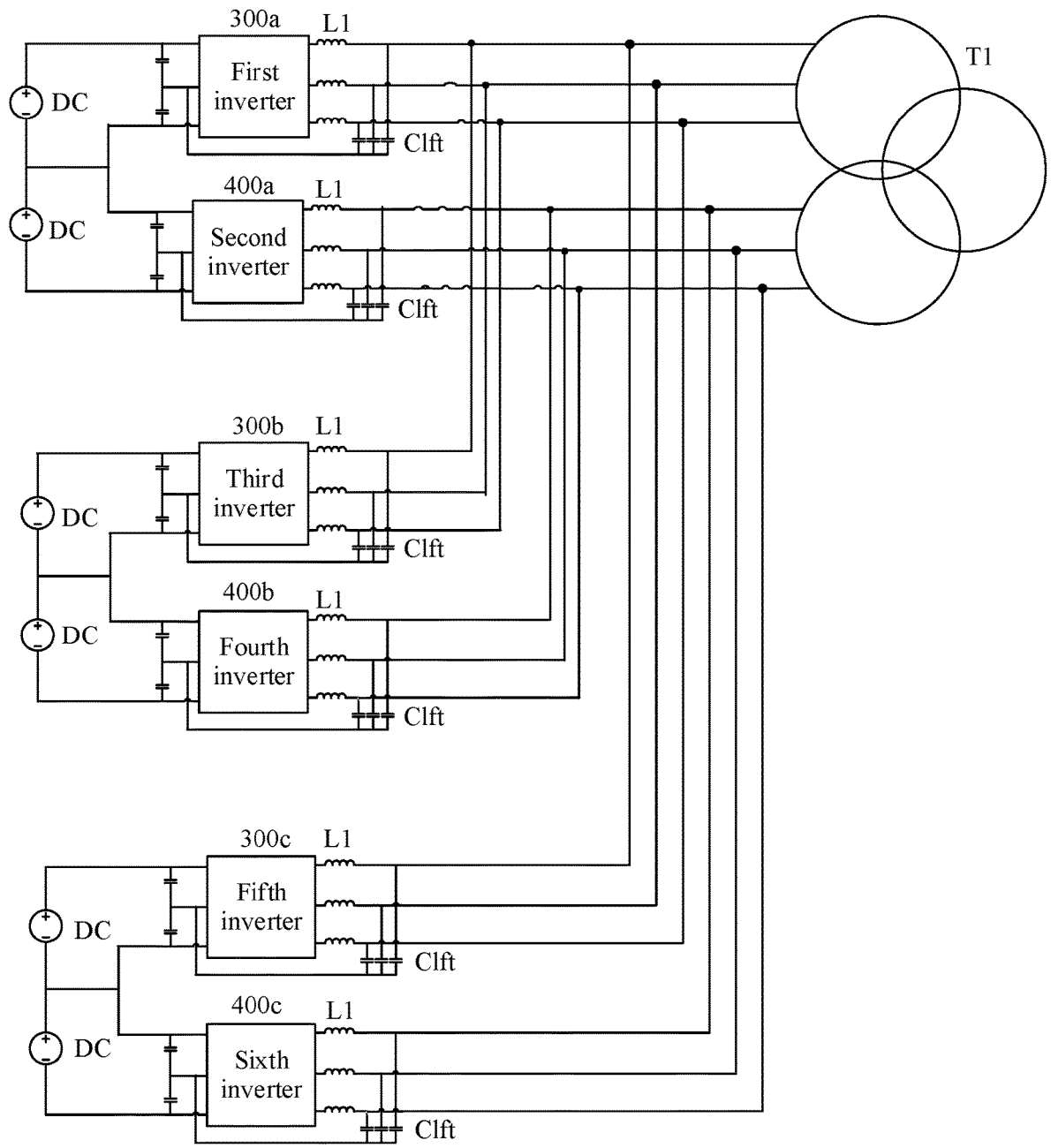
FIG. 4 is a schematic diagram of still another photovoltaic system according to an embodiment of this application.

In FIG. 3, only an example in which the bipolar photovoltaic system includes two groups of bipolar inverters is used for description, that is, M is 2. When M is 3, that is, three groups of bipolar inverters are included, refer to FIG. 4. FIG. 4 is a schematic diagram of another photovoltaic system according to an embodiment of this application.

In FIG. 4, a positive inverter group includes the following three inverters whose alternating current output ends are connected in parallel: a first inverter 300a, a third inverter 300b, and a fifth inverter 300c. Similarly, a negative inverter group includes the following three inverters whose alternating current output ends are connected in parallel: a second inverter 400a, a fourth inverter 400b, and a sixth inverter 400c.

A direct current input end of the first inverter 300a is connected in series to a direct current input end of the second inverter 400a. A direct current input end of the third inverter 300b is connected in series to a direct current input end of the fourth inverter 400b. A direct current input end of the fifth inverter 300c is connected in series to a direct current input end of the sixth inverter 400c.

Similarly, when a direct current bus of the first inverter 300a is short-circuited, the third inverter 300b and the fifth inverter 300c that are connected in parallel to the first inverter 300a are affected. In addition, because the direct current input ends are connected in series, the second inverter 400a, the fourth inverter 400b, and the sixth inverter 400c are also affected.

In FIG. 3 and FIG. 4, an example in which the positive inverter group and the negative inverter group share one transformer T1 is used for description. In addition, the positive inverter group and the negative inverter group may respectively correspond to transformers.

Figure 5:
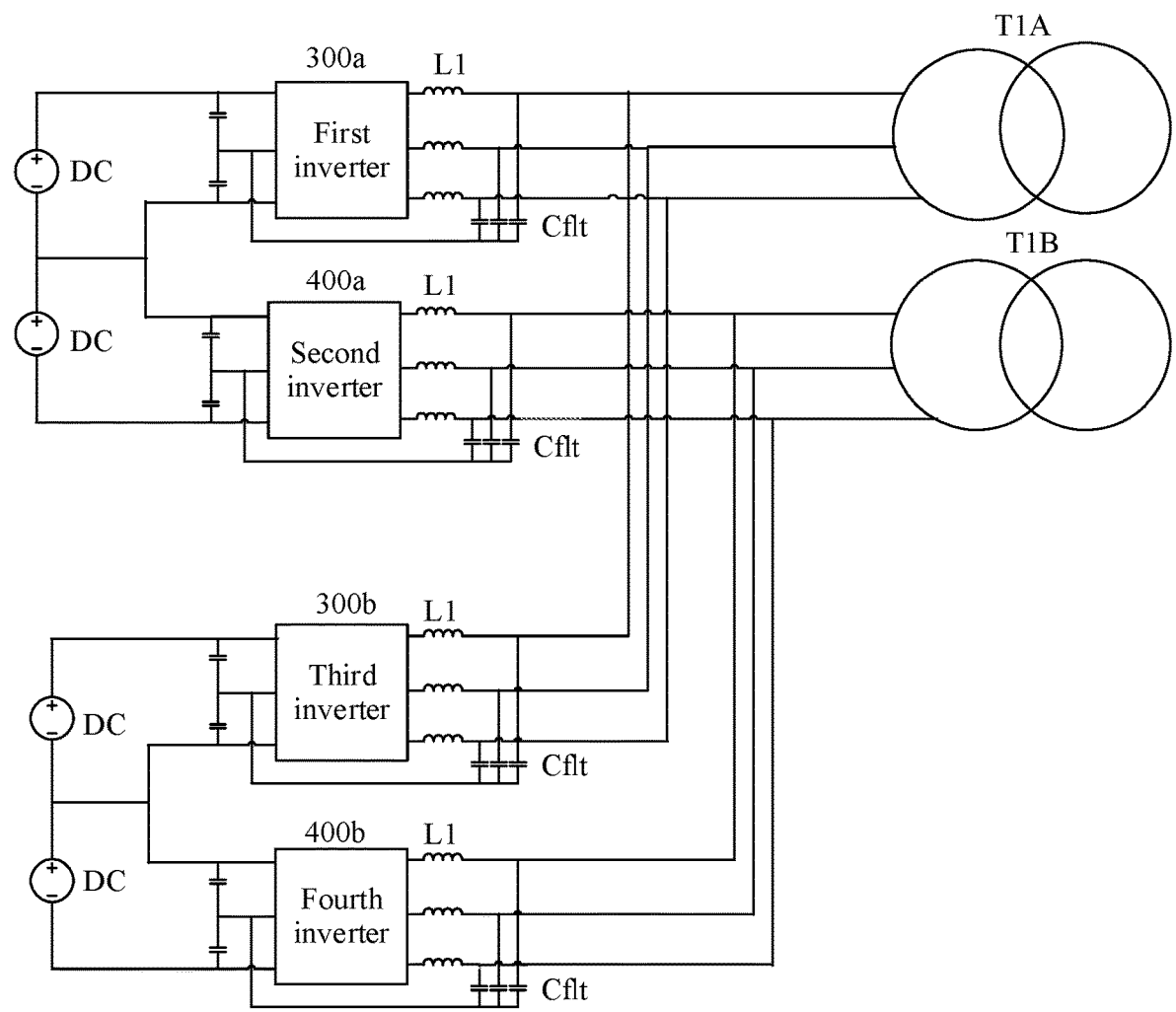
FIG. 5 is a schematic diagram of yet another photovoltaic system according to an embodiment of this application.

FIG. 5 is a schematic diagram of yet another photovoltaic system according to an embodiment of this application.

In FIG. 5, two groups of bipolar inverters are used as an example. Alternating current output ends of a positive inverter group are connected to a primary-side winding of a first transformer T1A. Alternating current output ends of a negative inverter group are connected to a primary-side winding of a second inverter transformer T1B.

With reference to FIG. 5, the following describes a process in which another inverter may be damaged when an inverter is short-circuited.

Two capacitors connected in series are connected between a positive direct current input end and a negative direct current input end of each inverter. Assuming that a voltage of each capacitor is U, a direct current input voltage of the inverter is 2 U. Direct current input ends of the first inverter 300a and the second inverter 400a are connected in series. Therefore, a corresponding direct current voltage after the two inverters are connected in series is 4 U. When a bus corresponding to one of the capacitors is short-circuited, that is, a half bus is short-circuited, a direct current bus voltage of the second inverter 400a is charged for being consistent with a sum of direct current voltages of the third inverter 300b and the fourth inverter 400b, that is, 4 U. As a result, a direct current input voltage of the second inverter 400a is 4 U, and a capacitor at the direct current input end of the second inverter 400a is damaged, and may explode.

An application scenario of the bipolar photovoltaic system is not limited in this embodiment of this application. For example, the bipolar photovoltaic system may be applied to a large photovoltaic power station, and corresponding inverters are all three-phase inverters.

The following describes a scenario in which the bipolar photovoltaic system is applied to the large photovoltaic power station.

Figure 6:
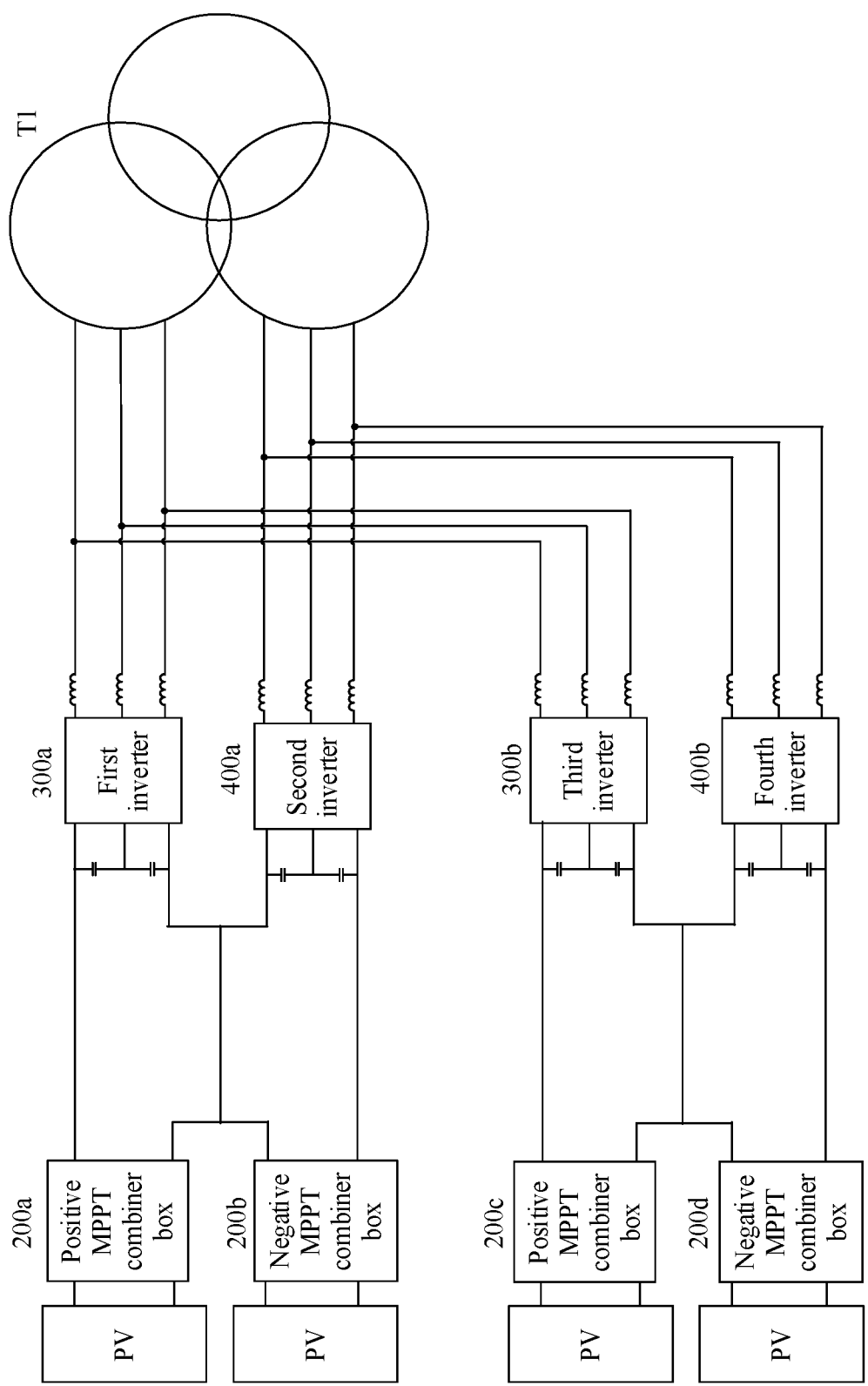
FIG. 6 is a schematic diagram of still yet another photovoltaic system according to an embodiment of this application.

FIG. 6 is a schematic diagram of still yet another photovoltaic system according to an embodiment of this application.

The photovoltaic system corresponding to FIG. 6 may be applied to a large photovoltaic power station. Power of an inverter may be large. An input end of each inverter may be connected to a corresponding combiner box. The combiner box may include a power converter. To increase a power capacity, each combiner box may include a plurality of power converters connected in parallel. An input end of each power converter is connected to a corresponding photovoltaic array PV. FIG. 6 shows only an example of the photovoltaic array PV. An implementation form of the photovoltaic array is not specifically limited in embodiments of this application. For example, the photovoltaic array may include a plurality of photovoltaic strings, and the photovoltaic strings are connected in parallel. Each photovoltaic string may include photovoltaic panels that are connected in series or connected in series or parallel.

A first inverter 300a, used as a positive inverter, is connected to a corresponding positive maximum power point tracking (MPPT) combiner box 200a. Similarly, a third inverter 300b, used as a positive inverter, is connected to a corresponding positive MPPT combiner box 200c.

A second inverter 400a, used as a negative inverter, is connected to a corresponding negative MPPT combiner box 200b. Similarly, a fourth inverter 400b, used as a negative inverter, is connected to a corresponding negative MPPT combiner box 200d.

A photovoltaic system with a low power level may not include a combiner box. An input end of an inverter is directly connected to a power converter, and an input end of the power converter is connected to a corresponding photovoltaic array. The technical solutions provided in this embodiment of this application do not limit a power value or a specific topology structure of the photovoltaic system, provided that there are inverters connected in parallel. Whether a short-circuit fault occurs is monitored by using a circulating current between the inverters connected in parallel, and protection is performed in a timely manner when the short-circuit fault occurs.

To suppress the circulating current in a timely manner, wave blocking needs to be performed on all inverters.

According to the description in the foregoing embodiment, the wave blocking is performed in a timely manner when the circulating current caused by the short-circuit fault is large. However, the photovoltaic system needs to be continued to run normally. Therefore, the fault needs to be isolated, and after the isolation, a normal inverter is enabled to operate. That is, the faulty inverter is isolated, and a non-faulty inverter is restored for operating. Wave blocking on the non-faulty inverter is released, that is, a power component of the non-faulty inverter resumes a switching action.

Figures 7, 8:
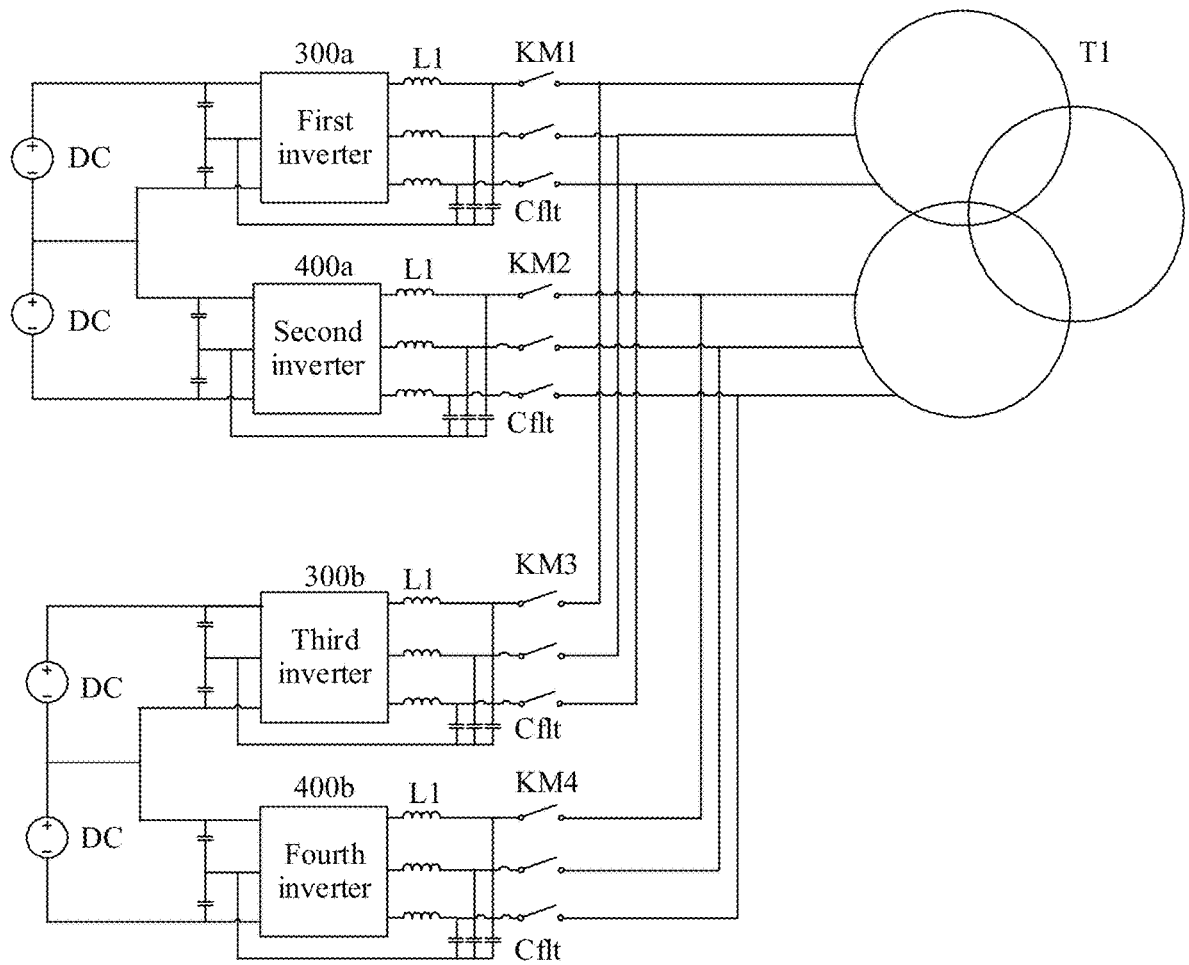
FIG. 7 is a schematic diagram of a further photovoltaic system according to an embodiment of this application.
FIG. 8 is a flowchart of a photovoltaic system protection method according to an embodiment of this application.

FIG. 7 is a schematic diagram of a further photovoltaic system according to an embodiment of this application.

A fault isolation measure is specifically as follows: After the wave blocking, the controller is further configured to turn off a grid-connected switch corresponding to a faulty inverter whose direct current bus voltage is less than a preset voltage threshold, and the grid-connected switch is connected in series between an alternating current output end of the corresponding inverter and a power grid.

In this embodiment, the faulty inverter is determined based on direct current bus undervoltage. In a possible implementation, a controller of the faulty inverter may notify a controller of an inverter connected in series to the faulty inverter that a short-circuit fault occurs.

As shown in FIG. 7, the first inverter 300a corresponds to a grid-connected switch KM1. The second inverter 400a corresponds to a grid-connected switch KM2. The third inverter 300b corresponds to a grid-connected switch KM3. The fourth inverter 400b corresponds to a grid-connected switch KM4.

For example, if a direct current bus of the first inverter 300a is short-circuited, a direct current bus voltage of the first inverter 300a definitely drops, that is, whether the direct current bus voltage drops may be determined by comparing the direct current bus voltage with the preset voltage threshold. When the direct current bus voltage drops, it indicates that the inverter is short-circuited. In addition, when the direct current bus voltage drops rapidly, that is, when a dropping rate of the direct current bus voltage is greater than a preset dropping rate, it may also be determined that the inverter is short-circuited.

As long as the direct current bus voltage is less than the preset voltage threshold, it indicates that a corresponding inverter is the faulty inverter, and the inverter needs to be isolated, that is, a grid-connected switch of the faulty inverter is turned off. Generally, the grid-connected switch is integrated inside the inverter, to prevent the faulty inverter from affecting another inverter and a device on an alternating current power grid side, for example, a transformer T1.

When the first inverter 300a is short-circuited, the corresponding grid-connected switch KM1 needs to be turned off. For the following three non-faulty inverters, the second inverter 400a, the third inverter 300b, and the fourth inverter 400b, the corresponding grid-connected switches may be turned off or may not be turned off.

To isolate the short-circuit fault more comprehensively, in a possible implementation, after the wave blocking, the controller is further configured to turn off a grid-connected switch corresponding to an inverter connected in series to the faulty inverter. That is, when the first inverter 300a is short-circuited, KM1 is turned off, and in addition, the grid-connected switch KM2 of the second inverter 400a connected in series to the first inverter 300a is also turned off.

In this embodiment of this application, an implementation form of the grid-connected switch is not limited, for example, the grid-connected switch may be a relay. The relay may be integrated inside a cabinet of the inverter.

The foregoing describes the process of performing isolation when the fault occurs. After the fault is isolated, the non-faulty inverter may be controlled to run and operate normally. For example, the photovoltaic system starts to generate electricity and is connected to a power grid for running. In other words, after the grid-connected switch corresponding to the faulty inverter is turned off, the controller is further configured to control a power component of the non-faulty inverter to resume a switching action. For example, if the first inverter 300a is faulty, power components of the non-faulty second inverter 400a, third inverter 300b, and fourth inverter 400b are controlled to perform switching actions. To be specific, wave blocking on all the non-faulty second inverter 400a, third inverter 300b, and fourth inverter 400b is released.

Method Embodiment

Based on the bipolar photovoltaic system provided in the foregoing embodiment, an embodiment of this application further provides a protection method of the bipolar photovoltaic system.

To more clearly describe protection logic when an inverter is short-circuited, the following describes the protection method executed by a controller with reference to the flowchart.

FIG. 8 is a flowchart of a photovoltaic system protection method according to an embodiment of this application.

The protection method of the bipolar photovoltaic system provided in this embodiment of this application is applied to the bipolar photovoltaic system, and the bipolar photovoltaic system includes: a controller and two groups of inverters. The two groups of inverters include a positive inverter group and a negative inverter group. The positive inverter group includes the following at least two inverters: a first inverter and a third inverter. The negative inverter group includes the following at least two inverters: a second inverter and a fourth inverter. Alternating current output ends of the first inverter and the third inverter are connected in parallel. Direct current input ends of the first inverter and the second inverter are connected in series. Alternating current output ends of the second inverter and the fourth inverter are connected in parallel. Direct current input ends of the third inverter and the fourth inverter are connected in series.

For a structure of the bipolar photovoltaic system, refer to the specific description of the foregoing system embodiment and the accompanying drawings. Details are not described herein again. The following only describes the protection logic.

The method includes the following steps.

S801: Obtain a circulating current between at least two inverters whose alternating current output ends are connected in parallel.

If one of a plurality of inverters connected in parallel is short-circuited an inverter connected in parallel to the inverter may be affected. Determining may be performed based on a circulating current between the inverters connected in parallel. One manner of obtaining the circulating current is to obtain a common-mode output current of the inverter, and use the common-mode output current to represent the circulating current of the inverter.

A common-mode output current of each inverter is obtained in a same manner. That is, a three-phase output current of each inverter is obtained, and an average value of three phases of obtained output currents is converted into the common-mode output current of the inverter.

The obtaining a circulating current between at least two of the inverters whose alternating current output ends are connected in parallel specifically includes: obtaining a three-phase output current of each of the inverters whose alternating current output ends are connected in parallel; and obtaining a common-mode output current of the corresponding inverter based on the three-phase output current, and using the common-mode output current as the circulating current of the inverter.

S802: When the circulating current is greater than a preset current threshold or a rising rate of the circulating current is greater than a preset rate, control all inverters whose corresponding alternating current output ends are connected in parallel to undergo wave blocking, where the wave blocking means that all power components of the inverters stop a switching action.

When one of the inverters connected in parallel is short-circuited, a large circulating current appears between the faulty inverter and an inverter connected in parallel to the faulty inverter. Therefore, to protect the inverter connected in parallel to the faulty inverter, the inverter connected in parallel to the faulty inverter also needs to be wave-blocked.

When the circulating current is greater than the preset current threshold, it indicates that the inverter is short-circuited, and a drive pulse signal of a power component of the inverter needs to be blocked, that is, wave-blocked. In an implementation, all drive pulse signals output by the controller each are at a low level, that is, a corresponding power component is turned off. A specific type of the power component is not limited in this embodiment of this application. For example, the power component may be any one of the following: an insulated gate bipolar transistor (IGBT), a silicon carbide (SiC) transistor, and a gallium nitride (GaN) transistor, or may be a metal-oxide-semiconductor field-effect transistor (MOSFET). Generally, the drive pulse signal output by the controller is sent to a control end of the power component. For example, the drive pulse signal may be generated by a complex programmable logic device (CPLD).

According to the description in the foregoing embodiment, the wave blocking is performed in a timely manner when the circulating current caused by the short-circuit fault is large. However, the photovoltaic system needs to be continued to run normally. Therefore, the fault needs to be isolated, and after the isolation, a normal inverter is enabled to operate. That is, the faulty inverter is isolated, and a non-faulty inverter is restored for operating. Wave blocking on the non-faulty inverter is released, that is, a power component of the non-faulty inverter resumes a switching action.

Figure 9:
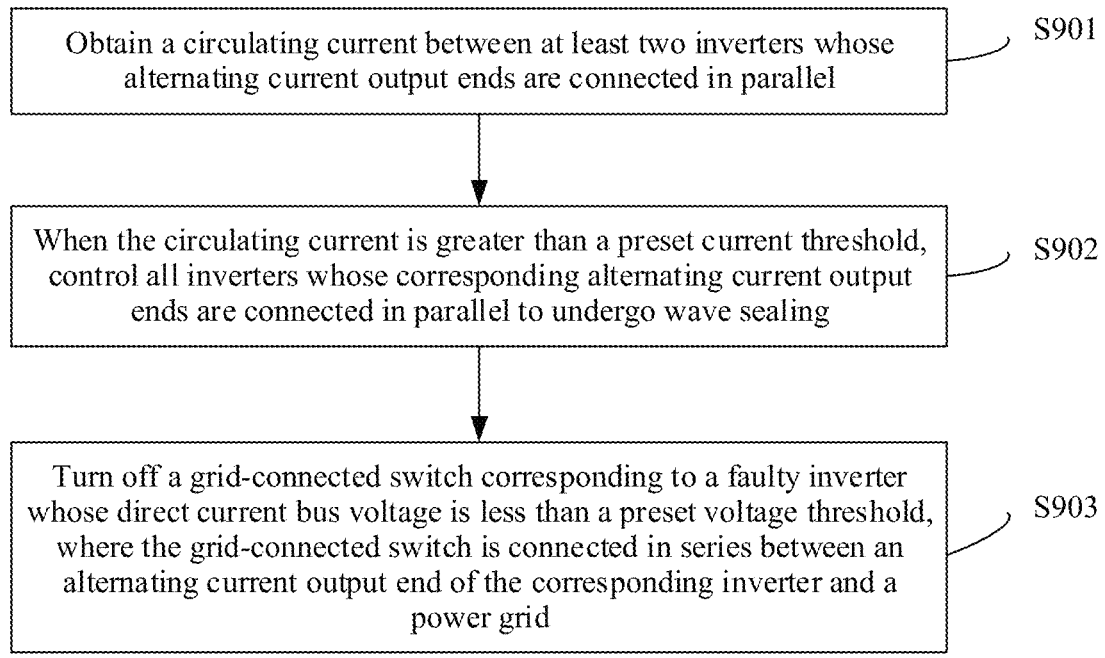
FIG. 9 is a flowchart of another photovoltaic system protection method according to an embodiment of this application.

FIG. 9 is a flowchart of another photovoltaic system protection method according to an embodiment of this application.

S901: Obtain a circulating current between at least two inverters whose alternating current output ends are connected in parallel.

S902: When the circulating current is greater than a preset current threshold or a rising rate of the circulating current is greater than a preset rate, control all inverters whose corresponding alternating current output ends are connected in parallel to undergo wave blocking, where the wave blocking means that all power components of the inverters stop a switching action.

S901 and S902 are respectively the same as S801 and S802 in FIG. 8. Details are not described herein again.

After the controlling all inverters whose corresponding alternating current output ends are connected in parallel to undergo wave blocking, a faulty inverter needs to be isolated, that is, the method further includes the following step.

S903: Turn off a grid-connected switch corresponding to a faulty inverter whose direct current bus voltage is less than a preset voltage threshold, where the grid-connected switch is connected in series between an alternating current output end of the corresponding inverter and a power grid.

Generally, the grid-connected switch is integrated inside a housing of a corresponding inverter. In addition, grid-connected switches are disposed at all phase output ends of the inverter. For example, grid-connected switches corresponding to a three-phase inverter include three switches, which are respectively connected in series to the phase output ends.

There is a sequence relationship between S903 and S902, and S903 needs to be performed after S902.

To isolate the short-circuit fault more comprehensively, in a possible implementation, after the wave blocking, the controller is further configured to turn off a grid-connected switch corresponding to an inverter connected in series to the faulty inverter.

Figure 10:
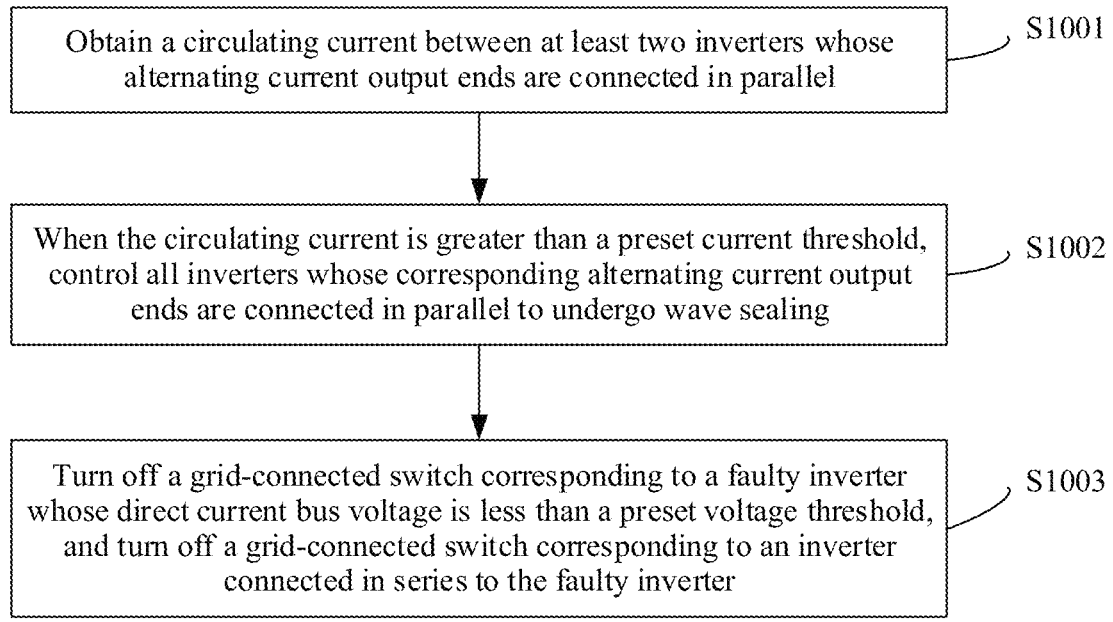
FIG. 10 is a flowchart of still another photovoltaic system protection method according to an embodiment of this application.

FIG. 10 is a flowchart of still another photovoltaic system protection method according to an embodiment of this application.

S1001: Obtain a circulating current between at least two inverters whose alternating current output ends are connected in parallel.

S1002: When the circulating current is greater than a preset current threshold, control all inverters whose corresponding alternating current output ends are connected in parallel to undergo wave blocking, where the wave blocking means that all power components of the inverters stop a switching action.

S1001 and S1002 are respectively the same as S801 and S802 in FIG. 8. Details are not described herein again.

After the controlling all inverters whose corresponding alternating current output ends are connected in parallel to undergo wave blocking, the method further includes the following step.

S1003: Turn off a grid-connected switch corresponding to a faulty inverter whose direct current bus voltage is less than a preset voltage threshold, and turn off a grid-connected switch corresponding to an inverter connected in series to the faulty inverter.

The grid-connected switch is connected in series between an alternating current output end of the corresponding inverter and a power grid.

There is a sequence relationship between S1003 and S1002, and S1003 needs to be performed after S1002.

The foregoing describes the process of performing isolation when the fault occurs. After the fault is isolated, the non-faulty inverter may be controlled to run and operate normally. For example, the photovoltaic system starts to generate electricity and is connected to a power grid for running. In other words, after the grid-connected switch corresponding to the faulty inverter is turned off, the controller is further configured to control a power component of the non-faulty inverter to resume a switching action.

Figure 11:
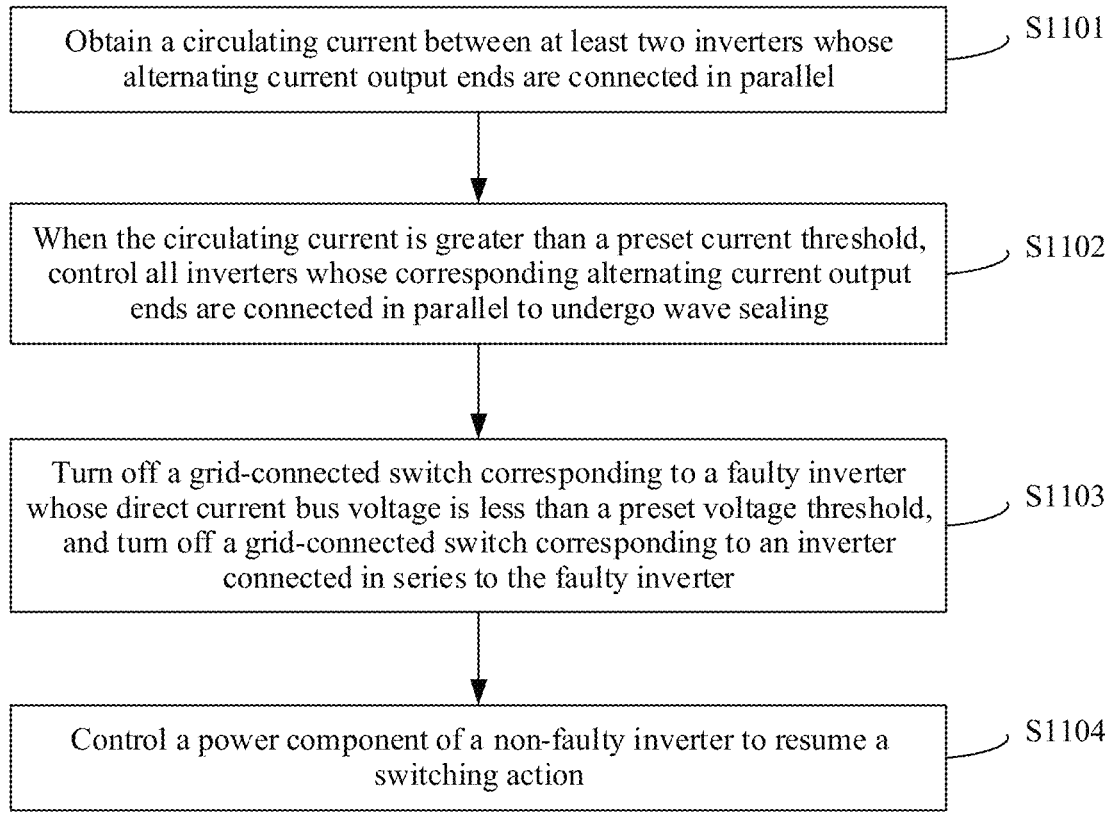
FIG. 11 is a flowchart of yet another photovoltaic system protection method according to an embodiment of this application.

FIG. 11 is a flowchart of yet another photovoltaic system protection method according to an embodiment of this application.

S1101: Obtain a circulating current between at least two inverters whose alternating current output ends are connected in parallel.

S1102: When the circulating current is greater than a preset current threshold, control all inverters whose corresponding alternating current output ends are connected in parallel to undergo wave blocking, where the wave blocking means that all power components of the inverters stop a switching action.

S1103: Turn off a grid-connected switch corresponding to a faulty inverter whose direct current bus voltage is less than a preset voltage threshold, and turn off a grid-connected switch corresponding to an inverter connected in series to the faulty inverter.

S1101 to S1103 are respectively the same as S1001 to S1003. Details are not described herein again.

S1104: After the grid-connected switch corresponding to the faulty inverter is turned off, the method further includes: controlling a power component of a non-faulty inverter to resume a switching action, that is, releasing wave blocking on the non-faulty inverter.

There is a sequence relationship between S1104 and S1103, and S1104 needs to be performed after S1103.

According to the protection method of the bipolar photovoltaic system provided in this embodiment of this application, when a direct current bus of the inverter is short-circuited, the short-circuit fault can be determined in a timely manner, and a wave blocking measure is performed. This avoids fault expansion and damaging in a component of the inverter. In addition, the faulty inverter may be further accurately isolated. That is, a direct current bus voltage of the inverter that is short-circuited is low, and an inverter whose direct current bus voltage is less than the preset voltage threshold is isolated, so that the inverter is disconnected from the bipolar photovoltaic system. Then, wave blocking on the non-faulty inverter is released and the non-faulty inverter starts to run, to perform photovoltaic power generation. According to the protection method provided in this embodiment of this application, a strict time sequence for performing actions can ensure that the faulty device is accurately isolated when the short-circuit fault occurs, and that the non-faulty device runs normally.

Inverter System Embodiment

The photovoltaic system provided in the foregoing embodiment is described by using a bipolar photovoltaic system as an example. The following describes a common inverter system. A specific application scenario of the inverter system is not limited. The specific application scenario may be a photovoltaic system or a scenario in which a direct current needs to be converted into an alternating current in another power supply field.

Figure 12:
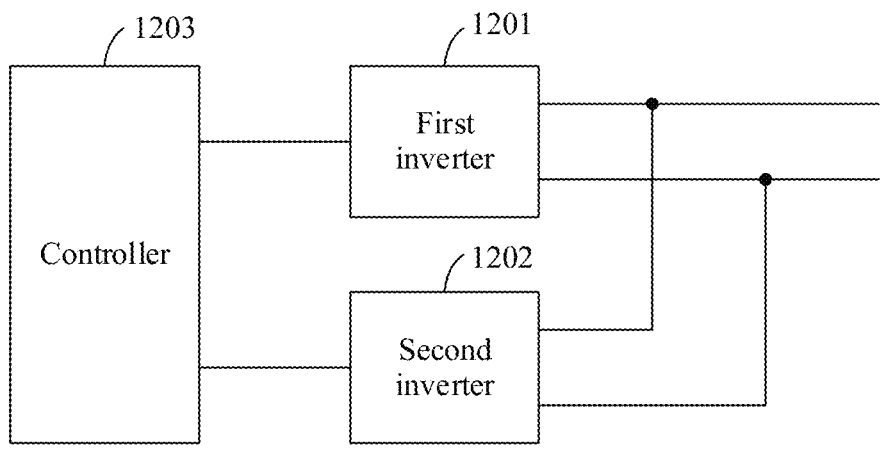
FIG. 12 is a schematic diagram of an inverter system according to an embodiment of this application.

FIG. 12 is a schematic diagram of an inverter system according to an embodiment of this application.

The inverter system provided in this embodiment of this application includes a controller 1203 and at least two inverters.

Input ends of the at least two inverters are respectively connected to corresponding photovoltaic arrays.

Alternating current output ends of the at least two inverters are connected in parallel.

For ease of description, this embodiment is described by using an example in which the following at least two inverters are included: a first inverter 1201 and a second inverter 1202. As shown in FIG. 12, an alternating current output end of the first inverter 1201 and an alternating current output end of the second inverter 1202 are connected in parallel.

The controller 1203 is specifically configured to: obtain a circulating current between at least two inverters whose alternating current output ends are connected in parallel; and when the circulating current is greater than a preset current threshold or a rising rate of the circulating current is greater than a preset rate, control all inverters whose corresponding alternating current output ends are connected in parallel to undergo wave blocking, where the wave blocking means that all power components of the inverters stop a switching action.

For example, when a circulating current of the first inverter 1201 is greater than the preset current threshold or a rising rate of the circulating current is greater than the preset rate, the controller 1203 may perform wave blocking on both the first inverter 1201 and the second inverter 1202, because the alternating current output ends of the first inverter 1201 and the second inverter 1202 are connected in parallel.

After the wave blocking, the controller 1203 is further configured to turn off a grid-connected switch corresponding to a faulty inverter whose direct current bus voltage is less than a preset voltage threshold, and the grid-connected switch is connected in series between an alternating current output end of the corresponding inverter and a power grid.

After the wave blocking, the controller 1203 is further configured to turn off a grid-connected switch corresponding to an inverter connected in series to the faulty inverter.

After the grid-connected switch corresponding to the faulty inverter is turned off, the controller 1203 is further configured to control a power component of a non-faulty inverter to resume a switching action. For example, when the second inverter 1202 is not faulty, the second inverter 1202 is controlled to be restored for operating.

The controller 1203 is further configured to: obtain a common-mode output current based on a three-phase output current of a corresponding inverter; and when the common-mode output current is greater than the preset current threshold or a rising rate of the common-mode output current is greater than the preset rate, control the inverter to undergo the wave blocking and control an inverter connected in parallel to a parallel-connected output end of the inverter to undergo the wave blocking.

In this embodiment, the common-mode output current represents the circulating current between the inverters. The controller may determine, based on the common-mode output current, whether a short-circuit fault occurs, to determine whether to perform the wave blocking on the inverter.

The inverters whose alternating current output ends are connected in parallel may affect each other. For example, when one of the inverters is short-circuited, a circulating current may occur between the inverters connected in parallel. If the circulating current is excessively high, the power component of the inverter may be damaged and power consumption may be excessively high. In a serious case, protection shutdown may be triggered. In this embodiment of this application, to resolve the short-circuit fault, the inverters are protected in a timely manner, to minimize further impact caused by the short-circuit fault.

It should be understood that in this application, "at least one" means one or more and "a plurality of" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A system, comprising:
    two groups of inverters comprising:
        a positive inverter group comprising:
            a first inverter comprising a first inverter alternating current (AC) output end and a first inverter direct current (DC) input end; and
            a third inverter comprising:
                a third inverter AC output end connected in parallel to the first inverter AC output end; and
                a third inverter DC input end;
        a negative inverter group comprising:
            a second inverter comprising:
                a second inverter AC output end; and
                a second inverter DC input end connected in series to the first inverter DC input end; and
            a fourth inverter comprising:
                a fourth inverter AC output end connected in parallel to the second inverter AC output end; and
                a fourth inverter DC input end connected in series to the third inverter DC input end; and
    a controller configured to:
        obtain a circulating current between a pair of inverters, wherein the pair of inverters comprises the positive inverter group or the negative inverter group; and
        control, when the circulating current is greater than a preset current threshold or a rising rate of the circulating current is greater than a preset rate, the pair of inverters to undergo wave blocking,
        wherein the wave blocking comprises stopping a switching action of all power components of the pair of inverters.

2. The system of claim 1, further comprising a power grid, wherein after the wave blocking, the controller is further configured to:
    identify a faulty inverter of the two groups of inverters whose direct current bus voltage is less than a preset voltage threshold, wherein the faulty inverter comprises:
        an AC output end; and
        a first grid-connected switch connected in series between the AC output end and the power grid; and
    turn off the first grid-connected switch.

3. The system of claim 2, wherein after the wave blocking, the controller is further configured to turn off a second grid-connected switch corresponding to a series-connected inverter that is of the two groups of inverters and that is connected in series to the faulty inverter.

4. The system of claim 2, wherein after the first grid-connected switch is turned off, the controller is further configured to control a power component of a non-faulty inverter of the two groups of inverters to resume a switching action.

5. The system of claim 1, wherein the controller comprises a plurality of controllers, wherein the plurality of controllers corresponds to a plurality of inverters, and wherein the plurality of inverters comprises the first inverter, the second inverter, the third inverter, and the fourth inverter.

6. The system of claim 5, wherein each controller of the plurality of controllers is configured to:
    obtain a common-mode output current based on a three-phase output current of a corresponding inverter, wherein the corresponding inverter comprises an output end connected in parallel to a parallel-connected inverter; and
    control, when the common-mode output current is greater than the preset current threshold or a rising rate of the common-mode output current is greater than the preset rate, the corresponding inverter to undergo the wave blocking and the parallel-connected inverter to undergo the wave blocking.

7. A method, comprising:
    obtaining a circulating current between at least two inverters whose alternating current output ends are connected in parallel; and
    controlling, when the circulating current is greater than a preset current threshold or a rising rate of the circulating current is greater than a preset rate, the at least two inverters to undergo wave blocking,
    wherein the wave blocking comprises stopping a switching action of all power components of the at least two inverters.

8. The method of claim 7, wherein after controlling the at least two inverters to undergo wave blocking, the method further comprises:
    identifying one of the at least two inverters is a faulty inverter when a direct current bus voltage of the faulty inverter is less than a preset voltage threshold; and
    turning off a first grid-connected switch corresponding to the faulty inverter, wherein the first grid-connected switch is connected in series between an alternating current output end of the faulty inverter and a power grid.

9. The method of claim 8, wherein after controlling the at least two inverters to undergo wave blocking, the controller further comprises turning off a second grid-connected switch corresponding to an inverter connected in series to the faulty inverter.

10. The method of claim 9, wherein after turning off the second grid-connected switch, the method further comprises controlling a power component of a non-faulty inverter to resume a switching action.

11. The method of claim 7, wherein obtaining the circulating current between the at least two inverters comprises:
 obtaining a three-phase output current of each of the at least two inverters;
 obtaining a common-mode output current of each of the at least two inverters based on the corresponding three-phase output current; and
 using the common-mode output current as the circulating current of each of the at least two inverters.

12. A system, comprising:
 direct current power supplies;
 at least two inverters comprising:
  power components;
  input ends respectively connected to the direct current power supplies; and
  alternating current output ends connected in parallel; and
 a controller configured to:
  obtain a circulating current between the at least two inverters; and
  control, when the circulating current is greater than a preset current threshold or a rising rate of the circulating current is greater than a preset rate, the at least two inverters to undergo wave blocking,
  wherein the wave blocking comprises stopping a switching action of the power components of the at least two inverters.

13. The system of claim 12, wherein after the wave blocking, the controller is further configured to:
 identify one of the at least two inverters is a faulty inverter when a direct current bus voltage of the faulty inverter is less than a preset voltage threshold; and
 turn off a first grid-connected switch corresponding to the faulty inverter, and wherein the first grid-connected switch is connected in series between an alternating current output end of the faulty inverter and a power grid.

14. The system of claim 13, wherein after the wave blocking, the controller is further configured to turn off a second grid-connected switch corresponding to an inverter connected in series to the faulty inverter.

15. The system of claim 13, wherein after the first grid-connected switch is turned off, the controller is further configured to control a power component of a non-faulty inverter of the at least two inverters to resume a switching action.

16. The system of claim 12, wherein the controller is further configured to:
 obtain a common-mode output current based on a three-phase output current of a corresponding inverter, wherein the corresponding inverter comprises an output end connected in parallel to a parallel-connected inverter;
 determine the circulating current metric based on the common-mode output current; and
 control, when the circulating current is greater than the preset current threshold or the rising rate of the circulating current is greater than the preset rate, the corresponding inverter to undergo the wave blocking and the parallel-connected inverter to undergo the wave blocking.

17. The system of claim 12, further comprising:
 two groups of inverters comprising:
  a positive inverter group comprising:
   a first inverter comprising a first inverter alternating current (AC) output end and a first inverter direct current (DC) input end; and
   a third inverter comprising:
    a third inverter AC output end connected in parallel to the first inverter AC output end; and
    a third inverter DC input end;
  a negative inverter group comprising:
   a second inverter comprising:
    a second inverter AC output end; and
    a second inverter DC input end connected in series to the first inverter DC input end; and
   a fourth inverter comprising:
    a fourth inverter AC output end connected in parallel to the second inverter AC output end; and
    a fourth inverter DC input end connected in series to the third inverter DC input end,
 wherein the at least two inverters comprises the positive inverter group or the negative inverter group.

18. The system of claim 17, wherein the controller comprises a plurality of controllers, wherein the plurality of controllers corresponds to a plurality of inverters, and wherein the plurality of inverters comprises the first inverter, the second inverter, the third inverter, and the fourth inverter.

19. The system of claim 1, wherein the power components comprise at least one of an insulated gate bipolar transistor (IGBT), a silicon carbide (SiC) transistor, a gallium nitride (GaN) transistor, or a metal-oxide-semiconductor field-effect transistor (MOSFET).

20. The system of claim 12, wherein the power components comprise at least one of an insulated gate bipolar transistor (IGBT), a silicon carbide (SiC) transistor, a gallium nitride (GaN) transistor, or a metal-oxide-semiconductor field-effect transistor (MOSFET).

* * * * *